United States Patent
Primc et al.

(10) Patent No.: US 11,807,555 B2
(45) Date of Patent: Nov. 7, 2023

(54) METHOD AND DEVICE FOR DISINFECTION OF LIQUID

(71) Applicants: Jožef Stefan Institute, Ljubljana (SI); National Institute of Biology, Ljubljana (SI); University of Ljubljana, Ljubljana (SI)

(72) Inventors: Gregor Primc, Ljubljana (SI); Rok Zaplotnik, Ljubljana (SI); Miran Mozetic, Ljubljana (SI); Arijana Filipic, Ljubljana (SI); Ion Gutierrez Aguirre, Ljubljana (SI); David Dobnik, Ljubljana (SI); Matevz Dular, Ljubljana (SI); Martin Petkovsek, Ljubljana (SI)

(73) Assignees: Jozef Stefan Institute, Ljubljana (SI); National Institute of Biology, Ljubljana (SI); University of Ljubljana, Ljubljana (SI)

(*) Notice: Subject to any disclaimer, the term of this patent is extended or adjusted under 35 U.S.C. 154(b) by 115 days.

(21) Appl. No.: 17/494,991

(22) Filed: Oct. 6, 2021

(65) Prior Publication Data
US 2022/0106206 A1    Apr. 7, 2022

(30) Foreign Application Priority Data
Oct. 7, 2020   (EP) .................... 20200482

(51) Int. Cl.
*C02F 1/34*    (2023.01)
*C02F 1/30*    (2023.01)
*C02F 1/46*    (2023.01)

(52) U.S. Cl.
CPC .............. *C02F 1/34* (2013.01); *C02F 1/30* (2013.01); *C02F 1/4608* (2013.01); *C02F 2303/04* (2013.01); *C02F 2305/023* (2013.01)

(58) Field of Classification Search
CPC ................ C02F 1/34; C02F 1/30; C02F 1/46
See application file for complete search history.

(56) References Cited

U.S. PATENT DOCUMENTS

| 7,704,401 B2 | 4/2010 | Ike et al. |
| 2014/0099687 A1 | 4/2014 | Gordon et al. |

FOREIGN PATENT DOCUMENTS

| CN | 103910426 A | 7/2014 |
| CN | 104129833 A | 11/2014 |

(Continued)

OTHER PUBLICATIONS

English machine translation of WO 2014077181 A1, Date Published May 22, 2014; Nakamura, Yasuhiro (Year: 2014).*

(Continued)

*Primary Examiner* — Walter D. Griffin
*Assistant Examiner* — Cameron J Allen
(74) *Attorney, Agent, or Firm* — ZIEGLER IP LAW GROUP LLC (57) ABSTRACT

An energy-efficient disinfection or sterilisation of contaminated liquid, such as water contaminated with viruses or microbes includes an asymmetric configuration of a cavitation nozzle made from dielectric material that enables the formation of a single, stable cavitation bubble of a large volume. A low-pressure gaseous plasma is continuously formed inside the cavitation bubble by electrodes to prevent contact of the metallic electrode with liquid water and Ohmic heating of the contaminated water. The electrodes are connected to a high voltage power supply. The power supply enables formation of a continuous stable gaseous discharge inside the cavitation bubble and radicals and radiation useful for destruction of viruses to the levels below the current US EPA standard in few minutes, while the temperature of liquid water remains practically unchanged. Use is not only for (Continued)

hospitals and pharmaceutical companies but the food industry and agriculture as well.

16 Claims, 5 Drawing Sheets

(56) References Cited

FOREIGN PATENT DOCUMENTS

| | | | |
|---|---|---|---|
| CN | 104150560 A | 11/2014 | |
| CN | 104355388 A | 2/2015 | |
| CN | 104355389 A | 2/2015 | |
| CN | 105541060 A | 5/2016 | |
| CN | 106525820 A | 3/2017 | |
| CN | 107879520 A | 4/2018 | |
| EP | 2036864 A1 * | 3/2009 | ............. C02F 1/006 |
| EP | 2036864 A1 | 3/2009 | |
| EP | 3579666 A1 | 12/2019 | |
| GB | 2565852 A | 2/2019 | |
| JP | 2011041914 A | 3/2011 | |
| WO | 2011021515 A1 | 2/2011 | |
| WO | WO-2011021515 A1 * | 2/2011 | ................ C02F 1/34 |
| WO | WO-2014077181 A1 * | 5/2014 | ............ C02F 1/4608 |

OTHER PUBLICATIONS

European Patent Office, Application No. 20200482.6, dated Mar. 26, 2021, 8 pages.
Skoro et al. "Electrical Breakdown in Water Vapor" Physical Review 84, published Nov. 10, 2011, DOI: 10.1103/PhysRevE.84.055401, 4 pages.

* cited by examiner

METHOD AND DEVICE FOR DISINFECTION OF LIQUID

FIELD

The aspects of the disclosed embodiments relate to devices and methods for disinfection of liquid, such as contaminated water and wastewater, by forming a cavitation bubble within the liquid and establishing a low-pressure gaseous discharge within the cavitation bubble.

The devices and methods are useful for deactivating viruses and microbes, such as bacteria and fungi, in contaminated water or wastewater.

BACKGROUND

Water contaminated with viruses or microbes, such as bacteria and fungi, typically requires treatment to deactivate the viruses or microbes before being used in industrial processes or released into the environment.

A standard method for disinfection or sterilisation of any material is heating (e.g. autoclaving). The material may be exposed to a temperature between about 100 and 140° C., typically at elevated pressure, for about an hour. This leads to the deactivation of any viruses and microbes. This method is beneficial for disinfection of various materials of small thermal capacity but impractical for sterilisation of water due to prohibitively high energy consumption. Heating a cubic metre of water from 20 to 100° C. requires the energy of several Giga Joules.

Several techniques for disinfecting and/or sterilising water are known and include filtration, chemical disinfection and irradiation. However, each of these methods has associated limitations. Due to their small size, filtering of viruses requires filters with small pore sizes. Such filters are difficult to manufacture and clog easily, necessitating frequent cleaning or maintenance. Chemical disinfection, such as treatment with chlorine, may result in the formation of harmful by-products that may persist in the treated water for extended periods of time. The penetrating ability of ultra-violet (UV) light is limited and the UV radiation may be absorbed or scattered by organic matter other than microbes and dust particles. Gamma sources are harmful and require the use of protective equipment.

Plasma sterilisation was a topic of increased research in the late 1900s and early 2000s. Gas (typically oxygen or air) passes a plasma device and forms reactive species, which are then dissolved in the contaminated water. However, commercialisation rarely occurred due to the low penetrating ability of plasma radicals. Gaseous plasma is impractical for sterilisation of liquids because plasma radicals only react with organic impurities on surfaces and the dissolution of plasma radicals in liquid is a slow process. Gaseous plasma cannot be sustained in liquids.

Several methods for enhancing dissolution of plasma radicals in liquids have been suggested.

CN104150560 places an electrode in close proximity to the surface of the liquid. CN104355388 and CN104355389 combine an oxygen plasma gas and water in a high-pressure jet device to produce a hydroxyl radical solution for treatment of wastewater. GB2565852 uses a gas flow means to cause gas to flow via an ioniser into the liquid to introduce hydroxyl radicals into the liquid.

Ultrasonic cavitation may be used to form small bubbles within the liquid due to the localised pressure gradients produced by standing acoustic waves. Shock waves produced by cavitation may also increase the chemical reactivity of the reactive species within the liquid. The combination of ultrasonic cavitation and gaseous plasma is disclosed in CN104129833 and CN105541060.

Non-equilibrium gaseous plasma created by inductively coupled discharge or electric arc discharge may also atomise the gas. CN106525820 discloses a device employing a gas inlet system which enables the introduction of atomised gas into a liquid through an inductively coupled discharge unit. Bubbles are formed in the liquid using ultrasonic cavitation so that the atomised gas may enter the bubbles formed by ultrasonic cavitation, increasing the area of the atomised gas-liquid surface. In CN107879520, a porous stone plate is used to bubble gas into the liquid. The bubbles enable ignition and sustenance of electrical arc at a powered electrode immersed in the liquid and in close proximity to the stone plate. (The grounded electrode is fixed to the walls of the container.) However, both electric arc and inductively coupled discharge are low impedance high-power gaseous discharges, so the consumption of electrical power is high in both cases. CN103910426 also uses a similar effect, except that a high-frequency high impedance generator is used for sustaining non-equilibrium plasma in compressed air, which is mixed with the liquid in a cavitation gas-liquid mixing device.

An alternative to injecting gas bubbles into the liquid is the formation of gas bubbles within the liquid by hydrodynamic cavitation. U.S. Pat. No. 7,704,401(B2) discloses a device having a nozzle that forms a restriction in a conduit. After passing through the nozzle, there is a rapid reduction in static pressure within the liquid. When the pressure falls below the saturated vapour pressure of the liquid, numerous small cavitation bubbles are generated due to boiling phenomenon. Electrodes placed within the cavitation space produce a high-density electric field, and are said to excite water vapour and oxygen contained in the cavitation bubbles and produce reactive species such as hydroxyl radicals and ozone. These active species dissolve in the liquid to degrade organic contaminants within the liquid.

The device disclosed in U.S. Pat. No. 7,704,401(B2) has significant drawbacks. The device utilises numerous micronized (or small) bubbles that are formed upon standard hydrodynamic cavitation. As such, the electrodes are always in contact with liquid water. While chemically pure water is an electric insulator, water contaminated with almost any impurity is a conductor. When the impedance of contaminated water is smaller than the impedance of the gas bubbles, the electrical current flows through the liquid water and not through the bubbles. Such an effect is regarded as detrimental for two reasons. Firstly, the voltage across a particular bubble will not be high enough to ignite the discharge inside the bubble, and so there is no plasma formation within in the bubbles. Secondly, electrical currently passing through the water causes resistive heating of the water. Indeed, the majority of the power supplied to the electrodes will be used for heating the contaminated water. Thus, the efficiency of the device disclosed in U.S. Pat. No. 7,704,401(B2) is low. U.S. Pat. No. 7,704,401(B2) does no provide experimental data to evaluate the efficiency of decontamination. Any decontamination effect may in fact be due to the resistive (Ohmic) heating of liquid water that is in contact with the electrodes.

EP2036864(A1) also discloses a device having a nozzle to form numerous gaseous bubbles by cavitation effect, and a couple of electrodes mounted in the volume where the cavitation bubbles are formed. The electrodes are wetted by the water flowing through the nozzle in all embodiments disclosed in EP2036864(A1), irrespective from the electrode configurations. More embodiments of almost identical invention are disclosed in JP2011041914(A), also published as WO2011021515. Thus, EP2036864 and JP2011041914 (A) has similar limitations as U.S. Pat. No. 7,704,401(B2)—numerous small bubbles prevent protrusion of electrodes into a bubble.

US2014/0099687(A1) teaches that bubble radius can be modulated using the ratio of orifice to throat diameter, which is effectively the slope or angle of a cone. Numerous embodiments are disclosed, and a few provide numerous bubbles of the diameter up to about 100 micrometres. If the bubbles are spherical, the volume of a bubble with diameter 100 micrometres will be about 0.002 $cm^3$. Such small bubbles are impractical for sustaining electrical discharges and preventing wetting of electrodes.

EP3579666(A1) discloses a tubular flow channel of various diameters. A water flow enables formation of numerous cavitation bubbles both downstream and upstream side of the narrowest side. The amount of bubbles generated by the cavitation increases with increasing flow velocity. Electrodes are positioned at the narrowest point of the flow channel. Plasma is generated using the bubbles generated on the upstream side of the narrowest point of the flow channel. A plurality of throat positions is disclosed and the voltage applied to the electrodes of the proceeding throat is always lower than on the previous throat. The voltage therefore gradually decreases along the flowing direction of the liquid. The voltage is preferably applied in pulses of about 1 microsecond. The downstream side inclined surface is preferably sinusoidal, what prevents separation of the liquid flow from the tube walls.

The aspects of the disclosed embodiments have been devised in light of the above considerations. Unlike previous art, aspects of the disclosed embodiments assure establishing stable gaseous plasma in one single large cavitation bubble so the electrodes are not wetted by the liquid.

SUMMARY

The aspects of the disclosed embodiments relate to the treatment of liquid, such as water contaminated with viruses and microbes. At its most general, the present disclosure involves forming a single, stable cavitation bubble within a flow of liquid and continuously generating a gaseous discharge within this single, stable cavitation bubble.

The large volume of the single, stable cavitation bubble allows a portion of an electrode to be positioned within the single, stable cavitation bubble. The low pressure within the single, stable cavitation bubble enables the efficient and continuous generation of a gaseous discharge by the electrode. The electrical power required to sustain gaseous discharge within the single, stable cavitation bubble is very low, typically around 30 W. This allows the efficient formation of radical species, such as H, O and OH radicals, which may dissolve in the liquid to react with and degrade organic material in the liquid, including viruses and microbes.

The generation of a continuous gaseous discharge within the single, stable cavitation bubble means that power is not lost to resistive heating of the liquid. As such, contaminated water having a broad range of electrical conductivity can be efficiently treated.

In a first aspect of the disclosed embodiments, there is provided a liquid treatment device comprising (a) a nozzle configured to sustain a single, stable cavitation bubble due to vaporisation phenomena caused by a reduction in static pressure in the liquid after passing the narrowest portion of the nozzle, and (b) one or more electrodes configured to generate a continuous gaseous discharge within the single, stable cavitation bubble.

Preferably the nozzle comprises a two-part divergent portion positioned downstream of the narrowest portion of the nozzle. The divergent portion typically comprises a truncated cone shape with the smallest face positioned toward the narrowest portion of the nozzle. This encourages the generation of a single, stable cavitation bubble which extends from the nozzle throat to the region downstream of the electrodes.

Preferably the angle of the first divergent part closer to the nozzle throat is in the range 3° to 20°, preferably 5° to 15°, and the angle of the second divergent part further from the nozzle throat is in the range 10° to 40°, preferably 20° to 30°. This encourages the formation of a single, stable cavitation bubble.

Preferably the electrodes are arranged to penetrate the single, stable cavitation bubble formed by the nozzle. This allows the efficient formation of a continuous gaseous discharge within this single, stable cavitation bubble.

Preferably, the electrodes comprise a discharge portion positioned within the single, stable cavitation bubble formed by the nozzle, and a conducting portion adjacent to the discharge portion. Preferably the surface of the conducting portion is coated with an insulator to prevent contact of liquid with the electrode. This ensures that power is not lost to resistive heating of the liquid.

In a second aspect of the disclosed embodiments, there is provided a liquid treatment method comprising (a) forming a single, stable cavitation bubble having a volume to ensure the electrodes to remain spatio-temporal unwetted 0.1 $cm^3$ or more within a flow of liquid, and (b) generating a continuous gaseous discharge within this single, stable cavitation bubble, what is possible only if the bubble is stable and does not collapse. If the bubble collapses, the gaseous discharge disappears and all electrical power used to sustain the discharge is lost to resistive heating of the liquid.

The low pressure within the single, stable cavitation bubble enables the efficient generation of a continuous gaseous discharge by the electrode. The generation of a continuous gaseous discharge within the single, stable cavitation bubble means that power is not lost to resistive heating of the liquid. In addition, contaminated liquids having a broad range of electrical conductivity can be efficiently treated.

Preferably, the method comprises deactivating viruses and microbes within the liquid. The method enables at least a 4-log reduction in active virus concentrations within the contaminated liquid.

Typically, the device of the first aspect of the disclosed embodiments is used in the method of the second aspect of the disclosed embodiments.

In a third aspect of the disclosed embodiments there is proved use of the device of the first aspect for disinfection and/or sterilisation of liquid.

These and other aspects and embodiments of the present disclosure are described in further detail below.

BRIEF DESCRIPTION OF THE DRAWINGS

The aspects of the disclosed embodiments are described with reference to the figures listed below.

During use, a pressure gradient is established to enable water to flow in the direction of arrow 1. The water is forced through a channel formed by upper dielectric guide 2, lower dielectric guide 3 and outer housing 4. The upper guide 2 is flat, while the lower guide 3 has a complex shape, as indicated in FIG. 1. Both guides are sandwiched between outer housing 4 made of a dielectric material. The configuration of the guides 2 and 3 enables the formation of a large, low-pressure single, stable cavitation bubble 5 filled with water vapour between the upper 2 and lower 3 guides. Upper electrode 6 and lower electrode 7 are immersed tightly into the dielectric guides 2 and 3, respectively. The electrodes 6 and 7 protrude into the single, stable cavitation bubble 5. The portion of each electrode adjacent to the surface of the dielectric guide 2 or 3 is coated with electrical insulator 8. In this configuration, the insulated portion of each electrode is in contact with liquid water and the uninsulated portion of the electrodes are immersed into the single, stable cavitation bubble 5 which is beneficial for sustaining gaseous plasma 9 between the electrodes 6 and 7.

In FIG. 4A, the insulating part 8 does not fully cover the part of the electrodes penetrating the single, stable cavitation bubble 5. In FIG. 4B, the insulating part 8 covers the electrodes 6 and 7 in full, including the parts penetrating the single, stable cavitation bubble 5.

FIG. 5 is a schematic of water treatment device according to an embodiment of the present disclosure. Inlet container 10 contains wastewater and water pump 11 positioned downstream of the nozzle. The flow of water is indicated by arrows 1. Water is moved by pump 11 and passes through the dielectric guides 2 and 3. Electrodes 6 and 7 are connected to high-voltage source 12, which provides power for continuously sustaining gaseous plasma 9 between the non-insulated segments of the electrodes 6 and 7. The flow of water continues to the outlet container 13. The water from the outlet container may be transferred back to the inner container 10 via connection pipe 14. The water from the inlet container 10 may pass through the dielectric guides 2 and 3 several times. Alternatively, the water from the outlet container passes the guides 2 and 3 only once. Disinfected water may be discharged to the environment.

FIG. 6 is plan view (top), side sectional view (bottom left) and cross-sectional view (bottom right) indicating the geometry of the device used in Example 2. A flow channel is formed by dielectric guides 2 and 3 and outer housing 4. Dielectric guides 2 and 3 form a convergent-divergent constriction within the flow channel. Convergent side 15 is at the upstream side, while two-part divergent side 16 and 18 are at the downstream side of the constriction. In this embodiment, convergent angle 15 is 14° while the angle of the first divergent part closer to the nozzle throat 16 is 7° and the angle of the second divergent part further from the nozzle throat 18 is 30°. At the convergent part, the speed of the liquid increases, causing static pressure to drop. At the narrowest portion of the device (the throat) 17, the pressure is the lowest, causing the liquid to evaporate. A small angle of the first and second divergent part extends the evaporation process prolongs static pressure recuperation downstream of the channel. This enables the formation of a single, stable cavitation bubble 5. The electrodes 6 and 7 are made from titanium rods of diameter 1 mm and insulated as shown in FIG. 1 with Teflon tubes 8. The electrodes are shown schematically in FIG. 4A. The portion of the titanium rods 6 and 7 stretching into the single, stable cavitation bubble and not covered with Teflon 8 is 0.5 mm. The electrodes are connected to a voltage source 12, which provides an appropriate voltage in any form, preferably an alternating voltage of adjustable voltage amplitude, preferably of at least 500 V.

DETAILED DESCRIPTION

The aspects of the disclosed embodiments are directed to the treatment of liquid, such as water contaminated with viruses and microbes. The disclosed embodiments involve forming a single, stable cavitation bubble having a certain volume of 0.1 cm$^3$ or more within a flow of liquid that provides spatio-temporal unwetted electrodes for generation of a continuous gaseous discharge within this single, stable cavitation bubble.

A known technique for establishing low-pressure bubbles inside a liquid is cavitation. Two known methods are ultrasonic cavitation and hydrodynamic cavitation. In ultrasonic cavitation, standing acoustic waves generate localised pressure gradients within the liquid, which in turn generate bubbles within the liquid. In hydrodynamic cavitation, liquid flowing through a restriction experiences a decrease in static pressure.

Both ultrasonic and standard hydrodynamic cavitation methods result in the formation of numerous small bubbles. The bubbles formed by ultrasonic and standard hydrodynamic cavitation methods typically have a diameter of diameter of 1 to 10 microns, and may be referred to as "micro" bubbles.

The bubbles formed by standard cavitation processes are too small to enable immersion of at least one (preferably two) electrode(s) inside a single bubble. Furthermore, they collapse quickly after being formed. Many small bubbles are formed stochastically (randomly or unpredictably) in the cavitation zone, so it is impossible to arrange electrodes to be in consistent contact with the bubbles.

Moreover, sustenance of gaseous plasma in such small bubbles is impractical since a necessary condition for establishing gaseous plasma inside a small bubble is a high enough voltage across a bubble. If the liquid is a perfect electrical insulator, the impedance of bubbles may be smaller than the impedance of the liquid, and the electrical current flows through the bubbles and forms plasma inside them. However, contaminated liquid, such as contaminated water, is never a perfect insulator, but can be electrically conductive due to the presence of various contaminants including minerals and organic material. For comparison, seawater exhibits conductivity as high as 5 S/m. Fresh drinking water has conductivity in the range of 5-50 mS/m, while high quality deionised water has a conductivity of about 5.5 µS/m at 25° C. Contaminated water may be considered to have a conductivity at least greater than 5 mS/m, the typical lower limit for drinking water.

As a result of the conductivity of the contaminated water, the impedance of the contaminated water is often smaller than the impedance of gas bubbles. When the impedance of the contaminated water is smaller than the impedance of gas bubbles, the electrical current flows through the liquid water and not through the bubbles; thus, the contaminated water is resistively heated. Such an effect is regarded as detrimental for two reasons. Firstly, the voltage across a particular bubble will not be high enough to ignite the discharge inside the bubble, and so there is no plasma formation within the bubbles. Secondly, electrical current passing through the water causes resistive heating of the water. Indeed, the majority of the power supplied to the electrodes will be used for heating the contaminated water. Thus, the efficiency of such device using numerous small "micro" bubbles is low.

A potential solution to this problem is to introduce gas from an outside source (e.g. bubbling the liquid), and to keep at least one electrode in contact with gas inside the bubble, not with liquid. Introducing gas from an outside source is beneficial since the bubbles that are formed when gas is introduced inside a liquid are much larger than the numerous "micron" bubbles. If gas is bubbled next to the electrodes, plasma is easily sustained as long as the gas bubble retains contact with the electrode. When a gas bubble detaches from the electrode surface, gaseous plasma almost immediately disappears.

The aspects of the disclosed embodiments use an alternative solution in which a single, stable cavitation bubble is established within the liquid. Electrodes may be immersed inside the large, single, stationary cavitation bubble. In the examples below, a single, stable cavitation bubble of volume 4.0 cm$^3$ was formed. In one example, the gas pressure inside a single, stable cavitation bubble was as low as 80 mbar. Such low pressure is particularly useful to ignite an electrical discharge and to sustain almost uniform plasma with various electrical discharges. Immersion of the electrodes within the single, stable cavitation bubble avoids contact with the liquid. Instead of heating liquid, the power is spent for sustaining gaseous plasma in the single, stable cavitation bubble, increasing the efficiency of the device.

Nozzle

The liquid treatment device of the present disclosure comprises a nozzle configured to sustain a single, stable cavitation bubble due to vaporisation phenomena caused by a reduction in static pressure in the liquid after passing the narrowest portion of the nozzle.

The nozzle is typically positioned with a channel or conduit. The nozzle provides a restriction within the channel, which causes a reduction in static pressure downstream of the nozzle.

The nozzle may have a convergent portion upstream of the narrowest portion of the nozzle (the throat) and a two-part divergent portion downstream of the narrowest portion of the nozzle. In use, liquid flows through the nozzle from the convergent portion to the two-part divergent portion. The convergent portion and two-part divergent portion may alternatively be termed convergent channel and divergent channel.

In the convergent portion, the cross-sectional area of the nozzle decreases. This causes increasing speed of the liquid (accelerated), causing the static pressure to drop. At the narrowest portion of the nozzle, the pressure is the lowest, causing the liquid to evaporate. In the divergent portion, the cross-section of the nozzle increases. The single, stable cavitation bubble is formed and sustained within the divergent portion of the nozzle. The single, stable cavitation bubble may extend downstream of the divergent portion before the bubble closes and liquid flow resumes.

Typically, the divergent portion is immediately adjacent to the narrowest portion of the nozzle.

The shape of the convergent portion is not particularly limited. The convergent portion may be a restriction orifice (a plate orifice). The cross-sectional area of the restriction orifice may decrease to the narrowest point (the throat) in a single step (a single-step restriction orifice) or it may decrease to the narrowest point in two or more steps (a multi-step restriction orifice).

The incline or taper of the convergent portion may have a uniform gradient. The incline or taper of the convergent portion may be described using the convergent angle. The convergent angle is the angle between the channel wall upstream of the convergent portion (e.g. immediately upstream of the convergent portion) and the channel wall in the convergent portion (see 15 in FIG. 6). Preferably, the convergent angle is in the range 5° to 45°, more preferably 10° to 30°, and even more preferably 10° to 20°. In the examples, the convergent angle is 14°.

The incline or taper of the divergent portion comprises of two sections. The incline or taper of the divergent portion (or each divergent section) may be described using the divergent angle. The divergent angle is the angle between the channel wall downstream of the divergent portion (e.g. immediately downstream of the divergent portion) and the channel wall in the divergent portion or section (see 16 and 18 in FIG. 6). The angle of the first divergent part closer to the nozzle throat is in the range 3° to 20°, preferably 5° to 15°, and the angle of the second divergent part further from the nozzle throat is in the range 10° to 40°, preferably 20° to 30°. In the examples, the angle of the first divergent part closer to the nozzle throat is 7° and the angle of the second divergent part further from the nozzle throat is 30°.

In one embodiment, the convergent angle and the angle of the first divergent part closer to the nozzle throat are the same.

In an alternative embodiment, the convergent angle and the angle of the first divergent part closer to the nozzle throat are different.

Preferably, the transition between convergent and divergent portion is discontinuous (abrupt). That is, preferably the transition between the convergent and divergent portion is not smooth. An abrupt transition encourages the generation of a single, stable cavitation bubble.

Convergent and divergent angles can be appropriately selected based on the speed of liquid through the device and the desired pressure in the system.

The cross-sectional area at the narrowest portion of the nozzle (the throat) can be appropriately selected based on the speed of liquid through the device and the desired pressure in the system. The cross-sectional area at the throat may be as small as 1 mm$^2$ or more. The cross-sectional area at the throat may be as large as 5 cm$^2$ or more. In the examples, the cross-sectional area at the throat is 5 mm$^2$.

The cross-sectional shape of the narrowest portion of the nozzle (the throat) is not particularly limited. Preferably the aspect ratio at the throat is large. For example, the cross sectional shape is a rectangle or ellipse. In the example, the cross-sectional shape is a rectangle in which the width (the distance between housing pieces 4) is 5 mm and the height (the distance between upper flow guide 2 and lower flow guide 3) is 1 mm.

A static pressure downstream of the narrowest portion of the nozzle (the throat) is 4- to 50-times, preferably 7- to 15-times lower after passing the narrowest portion of the nozzle.

The pressure downstream of the throat may be measured using standard techniques. For example, the pressure may be measured using a suitable pressure sensor.

Preferably, the nozzle comprises or consists of a dielectric material.

Single, Stable Cavitation Bubble

The aspects of the disclosed embodiments involve the formation of a large bubble (vapour cavity) in the region downstream of the narrowest portion of the nozzle. The bubble is stable (its size does not significantly fluctuate over space and time). Establishment of a single, stable cavitation bubble is necessary to allow one or more electrodes to be positioned within the bubble and enable efficient generation of a continuous gaseous discharge.

The presence of a single, stable cavitation bubble may be determined by standard techniques. For example, a portion of the nozzle housing may be transparent and the single, stable cavitation bubble may be observed visually or using a camera, or detected using an optical sensor.

Alternatively, the presence of a single, stable cavitation bubble may be determined by measuring the change in static pressure downstream of the narrowest portion of the nozzle (the throat) over time. The single, stable cavitation bubble is stable and so the pressure downstream of the throat does not significantly fluctuate over time. This is different to standard hydrodynamic cavitation, in which the presence of many small bubbles causes significant pressure fluctuations.

The single, stable cavitation bubble of the present disclosure has a volume of 0.1 cm$^3$ or more, such as 0.2 cm$^3$ or more, 0.3 cm$^3$ or more, 0.4 cm$^3$ or more, 0.5 cm$^3$ or more or 1.0 cm$^3$ or more. In the examples, a single, stable cavitation bubble having a volume of 4.0 cm$^3$ or more was generated.

The volume of the single, stable cavitation bubble may be determined using standard techniques. For example, by observing the single, stable cavitation bubble visually or using a camera.

Electrodes

The liquid treatment device of the present disclosure comprises one or more electrodes configured to generate a gaseous discharge within the single, stable cavitation bubble.

The number of electrodes is not particularly limited. Where the gaseous discharge is a dielectric barrier discharge, one or more electrodes may be used. Where the gaseous discharge is a glow discharge, two or more electrodes may be used.

Preferably the (or each) electrode penetrates the single, stable cavitation bubble formed by the nozzle when the device is in use. That is, the (or each) electrode is arranged to protrude into the region of reduced static pressure downstream of the narrowest portion of nozzle. Typically, the (or each) electrode protrudes into the divergent portion of the nozzle.

The shape of each electrode is not particularly limited. A rod-shaped electrode may be used, for example a rod having a diameter of 1 mm. Alternatively, a mushroom-type electrode comprising a pillar (stem) with a broad top (cap). A mushroom-type electrode is advantageous as the broad top increases the surface of the electrode positioned within the single, stable cavitation bubble during use. The top may be perforated to encourage radiation arising from plasma between the electrodes to expand into the liquid. Preferably, the broad top is mounted parallel to the flow of liquid in order to minimise disturbance of the single, stable cavitation bubble.

The electrode material is not particularly limited. Example electrode materials include titanium, copper, stainless steel, nickel and graphite.

The electrodes may have an electrical insulator mounted to all or part of their surface.

The electrodes may comprise a discharge portion. The discharge portion is arranged to penetrate the single, stable cavitation bubble formed by the nozzle during use. That is, the discharge portion is positioned within the single, stable cavitation bubble during use. Typically, this is the portion of the electrodes located toward the centre of the channel. This permits efficient continuous generation of a gaseous discharge within the single, stable cavitation bubble.

Where the gaseous discharge is a dielectric barrier discharge, the discharge portion has an insulator mounted to its surface. Where the gaseous discharge is a glow discharge, the discharge portion does not have an electrical insulator mounted to its surface.

The electrodes may comprise a conducting portion. The conducting portion is adjacent to the discharge portion. Typically, this is the portion of the electrodes located toward the channel wall. The conducting portion is configured to provide an electrical connection between the discharge portion and an external power supply.

Preferably, the conducting portion has an electrical insulator mounted to all or part of its surface. In use, the single, stable cavitation bubble may not fill the entire nozzle and liquid may be present adjacent to the channel wall. Thus, the conducting portion is typically the portion of the electrode in contact with the liquid. Therefore, coating the external surface of the conducting portion with an electrical insulator prevents contact of the electrode with the liquid and reduces resistive (Ohmic) heating of the liquid. This also increases the efficiency of continuous gaseous plasma generation within the single, stable cavitation bubble.

The insulating material is not particularly limited. Any dielectric material having sufficient dielectric strength may be used. Example insulating materials include Teflon and glass.

The position of the electrodes within the single, stable cavitation bubble is not particularly limited. The electrodes may penetrate the single, stable cavitation bubble from opposite sides. In such cases, the electrodes may be positioned symmetrically (in-line) or asymmetrically (offset). The electrodes may penetrate the single, stable cavitation bubble from the same side.

During use, the electrodes may be electrically connected to a power supply, such as a high voltage power supply, to enable plasma generation. The power supply may provide a DC voltage, a pulsed DC voltage, or an AC voltage of any wave shape and frequency sufficient to sustain gaseous discharge in the single, stable cavitation bubble.

Where the gaseous discharge is a glow discharge, the power supply should be capable of providing a voltage of 300 V or more, such as 500 V or more, or 700 V or more. Where the gaseous discharge is a dielectric barrier discharge, the power supply should be capable of providing several kilovolts.

Gaseous Discharge

The aspects of the disclosed embodiments involve the formation of a gaseous discharge, such as a plasma, within the single, stable cavitation bubble.

Typically, the gaseous discharge is cold but rich in molecular fragments such as H, O and OH radicals. Some radicals are associated with molecules such as $H_2$, $O_2$, $HO_2$, $O_3$, $H_2O_2$ and others. All these species may interact with liquid water and may dissolve in liquid to form reactive species that interact chemically with any organic material in the liquid water, including microbes like viruses, bacteria and fungi. Some molecules and radicals are excited upon plasma conditions and may emit ultraviolet radiation that also causes deactivation of microbes. If a bubble collapses, the radicals and their products are dissolved in water.

The gaseous discharge may be a DC or AC glow discharge, and may include radio-frequency and microwave discharges.

Device

The water treatment device may comprise additional components as is common in the art.

The water treatment device may comprise a pump for establishing a pressure difference between the upstream and downstream ends of the nozzle. The type of pump is not particularly limited. A piston, peristaltic or rotary pump may be used.

The pressure of the liquid that is fed into the nozzle (upstream of the nozzle) is not particularly limited. The pressure upstream of the nozzle may be in the range 0.1 bar to 10 bar, for example 0.5 bar to 5 bar. In the examples, the pressure upstream of the nozzle is approximately 1 bar.

The speed of liquid that is fed into the nozzle is adjusted to generate the single, stable cavitation bubble. The speed of liquid may be appropriately adjusted based on the size and geometry of the nozzle. The speed of liquid may be in the range 50 m/s to 500 m/s, preferably 100 m/s to 300 m/s. In the examples, the speed of liquid is from 200 m/s to 250 m/s.

The pump may be positioned upstream or downstream of the nozzle. Preferably, the pump is positioned downstream of the nozzle.

The water treatment device may comprise a flow meter to measure the flow and speed of liquid fed into the nozzle.

The water treatment device may comprise a pressure sensor positioned within the nozzle, for example within the divergent portion.

Liquid

The aspects of the disclosed embodiments may be used for the disinfection of liquid, typically liquid water. The aspects of the disclosed embodiments are particularly useful for the deactivation of viruses and microbes such as bacteria and fungi in contaminated water.

Exemplary uses of the aspects of the disclosed embodiments include the disinfection of tap water, sewage, industrial wastewater, agricultural wastewater or run-off, and remediation of environmental water sources such as lakes and rivers. The aspects of the disclosed embodiments are particularly useful for disinfection of wastewater from hospitals and clinics, and wastewater from the pharmaceutical industry.

The aspects of the disclosed embodiments enable decontamination of water heavily contaminated with microbes. In particular, the device enables deactivation of viruses to the levels that are regarded as sterile by European and US standards. For example, the method enables at least a 4-log reduction in active virus as stated in the US EPA Ground Water Rule (EPA 815-R-06-012; October 2006):

https://nepis.epa.gov/Exe/ZyPDF.cgi/
P1002XR7.PDF?Dockey=P1002XR7.PDF

The aspects of the disclosed embodiments may also be used for degradation of organic pollutants. In comparison to deactivation of viruses and microbes, degradation of organic pollutants requires repeated treatment and longer treatment times (typically greater than an hour per litre).

Method

The aspects of the disclosed embodiments also provide a method for treating liquid. The method comprises (a) forming a single, stable cavitation bubble having a volume that ensure electrodes to remain spatio-temporal unwetted within a flow of liquid; and (b) generating a continuous gaseous discharge within the single, stable cavitation bubble.

Preferably, the method uses the device described herein.

Typically, the method comprises flowing the liquid through a nozzle to form the single, stable cavitation bubble. Suitable nozzles are set out above, along with suitable pumps for establishing a pressure difference between the upstream and downstream ends of the nozzle.

The nozzle provides a restriction within the flow of liquid. Flowing liquid through the nozzle causes the speed of liquid to increase (accelerate), reducing static pressure downstream of the nozzle.

Typically, the method comprises reducing the static pressure 5- to 20-times, preferably 7- to 15-times downstream of the nozzle.

The method may comprise feeding liquid into the nozzle at a predetermined flow rate. The speed of liquid may be in the range 50 m/s to 500 m/s, preferably 150 m/s to 300 m/s. In the examples, the speed of liquid is from 200 m/s to 250 m/s.

Suitable electrode materials and configurations are set out above, along with suitable power sources.

Typically, the method comprises applying a voltage to one or more electrodes configured to generate a continuous gaseous discharge within the single, stable cavitation bubble. Suitable electrode configurations are set our above.

Where the gaseous discharge is a glow discharge, the method comprises establishing a potential difference between two electrodes to generate the gaseous discharge within the single, stable cavitation bubble. Typically, the potential difference may be 300 V or more, such as 500 V or more, or 700 V or more. Where the gaseous discharge is a dielectric barrier discharge, the method may comprise apply a voltage of several kilovolts to an electrode.

Typically, the gaseous discharge is rich in molecular fragments such as H, O and OH radicals as set out above. Some radicals are associated with molecules such as $H_2$, $O_2$, $HO_2$, $O_3$, $H_2O_2$ and others. The method may comprise dissolving the radicals within the liquid.

The radicals may form reactive species within the liquid. The method may comprise the step of deactivating microbes or viruses within the liquid, such as contacting the reactive species with the microbes or viruses within the liquid.

Other Preference

Each and every compatible combination of the embodiments described above is explicitly disclosed herein, as if each and every combination was individually and explicitly recited.

Various further aspects and embodiments of the present disclosure will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the present disclosure and apply equally to all aspects and embodiments which are described.

EXAMPLES

Certain aspects and embodiments of the present disclosure will now be illustrated by way of example and with reference to the figures described above.

Example 1

Figure 8:
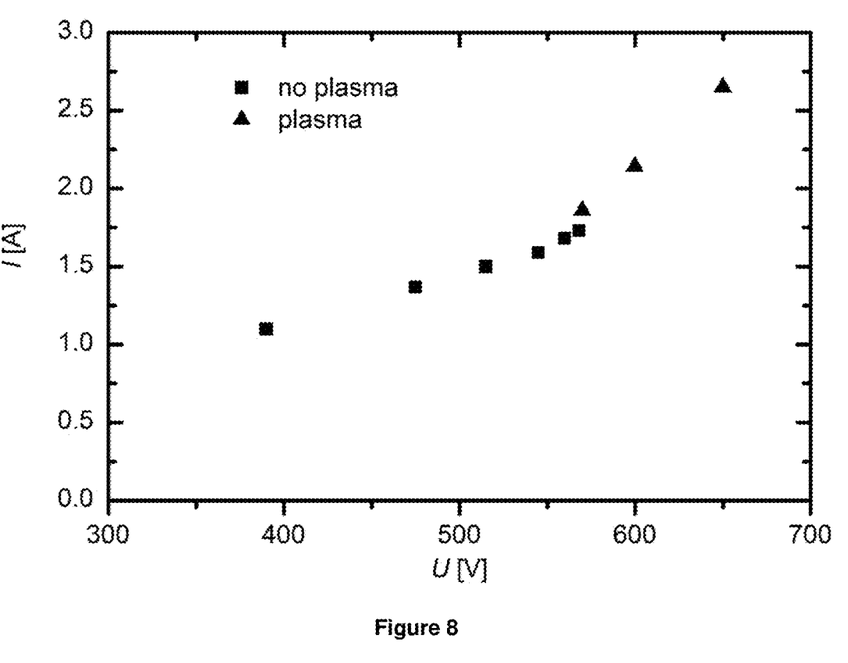
FIG. 8 shows the measured electrical current versus the voltage of the voltage source 12 for the configuration as in FIG. 6, except that dielectric guides 2 and 3 were replaced with metallic guides connected to the voltage source 12 and the electrodes 6 and 7 were omitted (Example 1).

A typical combination of gaseous plasma and hydrodynamic cavitation with numerous small bubbles, for example, as disclosed in U.S. Pat. No. 7,704,401(B2) was not found useful for sterilisation of water without heating it to elevated temperatures. In Example 1, the dielectric guides 2 and 3 were replaced with metallic guides, and the metallic guides were connected to a voltage source 12. The configuration was without electrodes 6 and 7. With increasing voltage, the corresponding current was measured. FIG. 8 represents the measured current versus measured voltage for the case of metallic guides 2 and 3 (Example 1). One observes an almost linear increase of the current as the voltage is increased. The curve in FIG. 8 is a classic example of Ohmic heating. The current is rather large. The slope of the curve represents the resistance of the medium between the electrodes. The value calculated from FIG. 8 is about 340Ω. The conductivity of the medium is the inverse value of the resistance, i.e. about 3 mS for the curve from FIG. 8. This value is typical for the resistance of polluted water at the given distance between the electrodes. There is a small jump in the current when plasma is ignited at a specific voltage. However, this jump is minimal. The power of the voltage source 12 is therefore spent mostly for heating the liquid water rather than sustaining gaseous plasma in the single, stable cavitation bubble in Example 1.

Example 2

Figure 1:
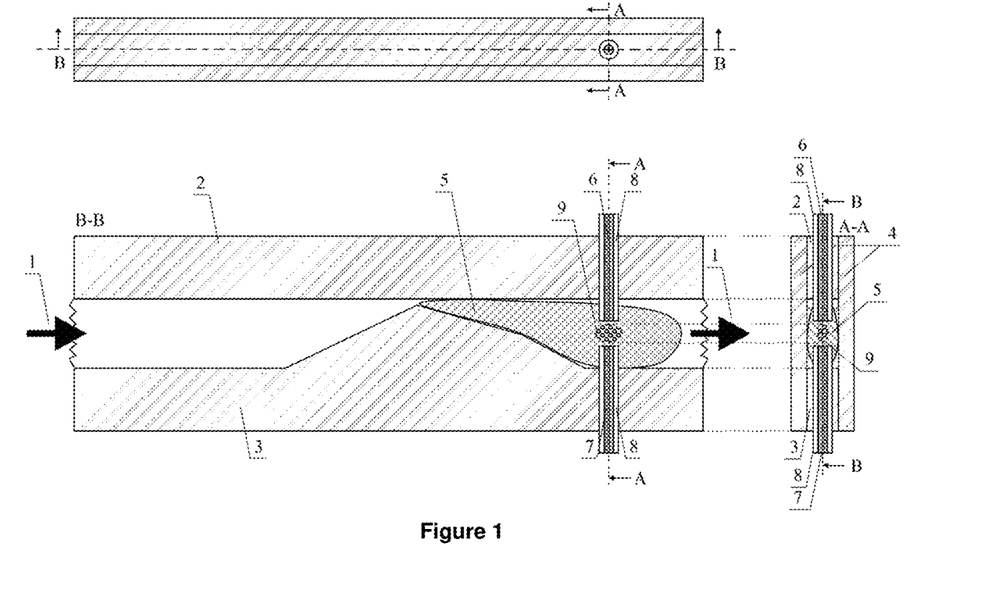
FIG. 1 (top) is a plan view of a water treatment device according to an embodiment of the present disclosure. At bottom left is a side-sectional view through line B-B, at bottom right is a cross-sectional view through line A-A.
Figure 2:
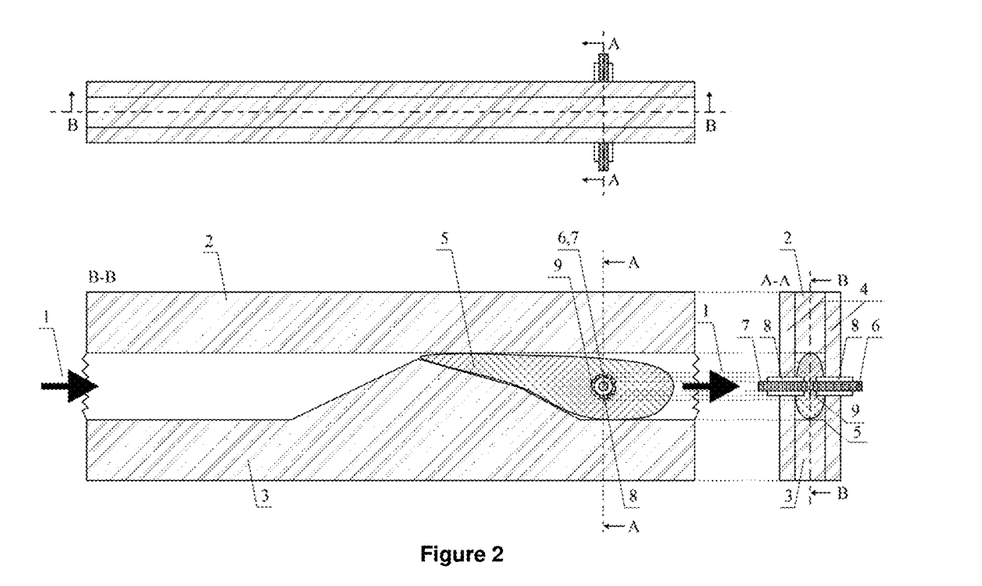
FIG. 2 (top) is a plan view of a water treatment device according to another embodiment of the present disclosure. At bottom left is a side-sectional view through line B-B, at bottom right is a cross-sectional view through line A-A. This embodiment is similar to the one described in FIG. 1 except that electrodes 6 and 7 are mounted through outer housing 4, perpendicular to lower dielectric guide 2 and upper dielectric guide 3. This configuration reduces penetration of the electrodes 6 and 7 into single, stable cavitation bubble 5.
Figure 3:
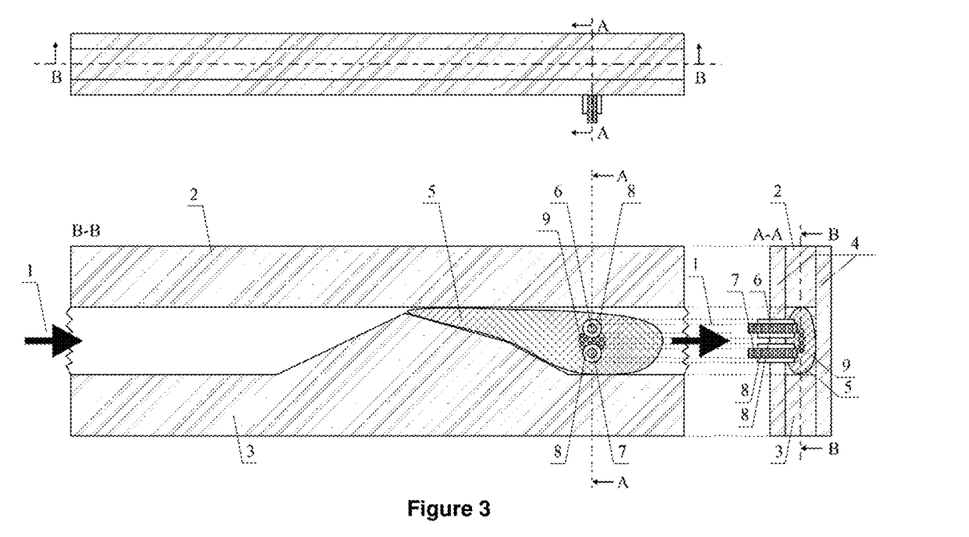
FIG. 3 (top) is a plan view of a water treatment device according to another embodiment of the present disclosure. At bottom left is a side-sectional view through line B-B, at bottom right is a cross-sectional view through line A-A. This embodiment is similar to the one described in FIG. 2 except that electrodes 6 and 7 are mounted perpendicularly only to one of the side of the device. This configuration may permit a greater distance between the non-insulated tips of electrodes 6 and 7, dependent on the size of the single, stable cavitation bubble 5.
Figure 5:
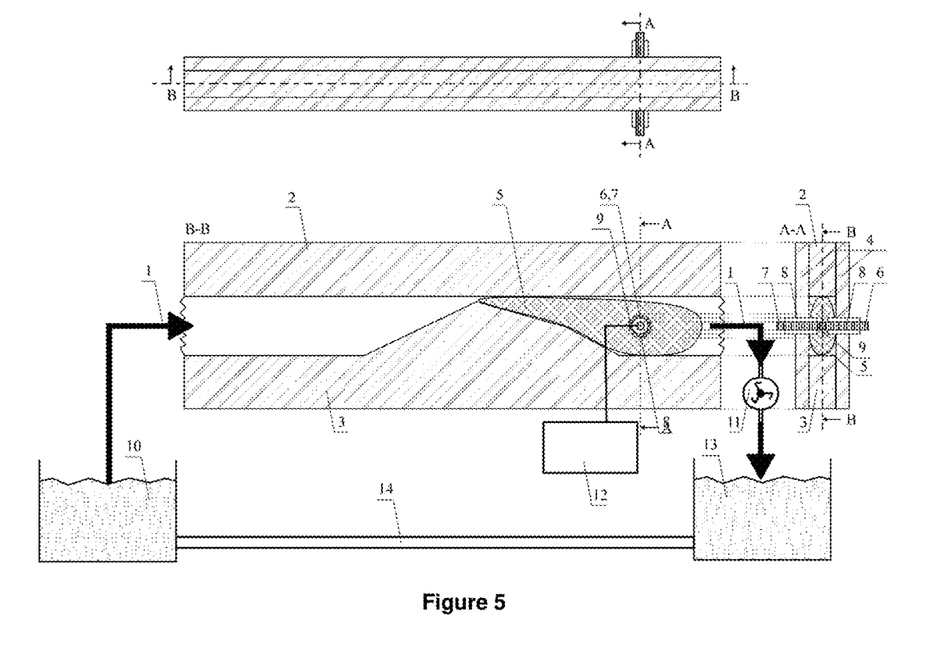
Figure 6:
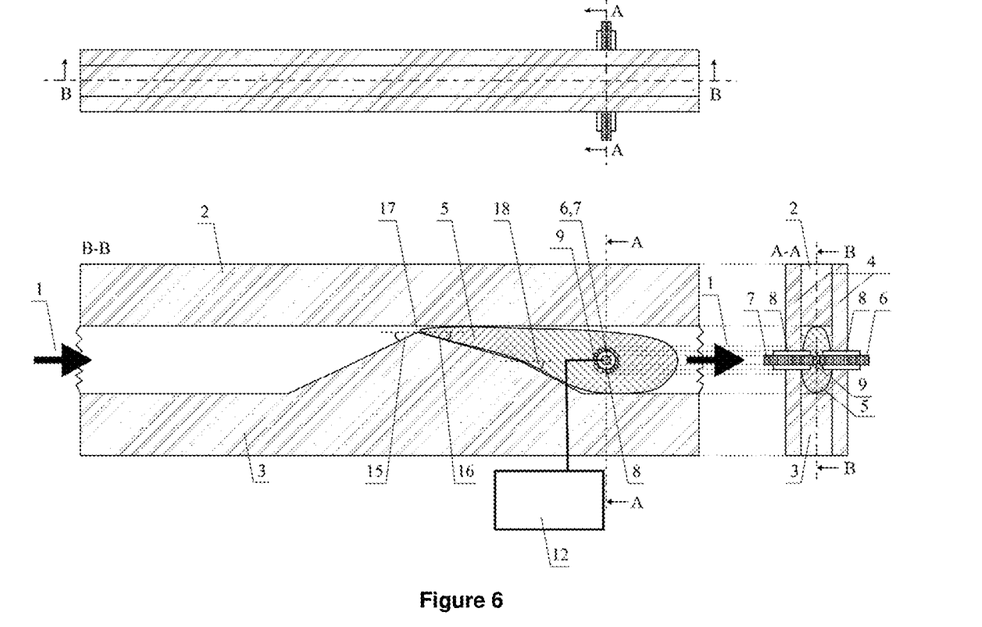
Figure 7:
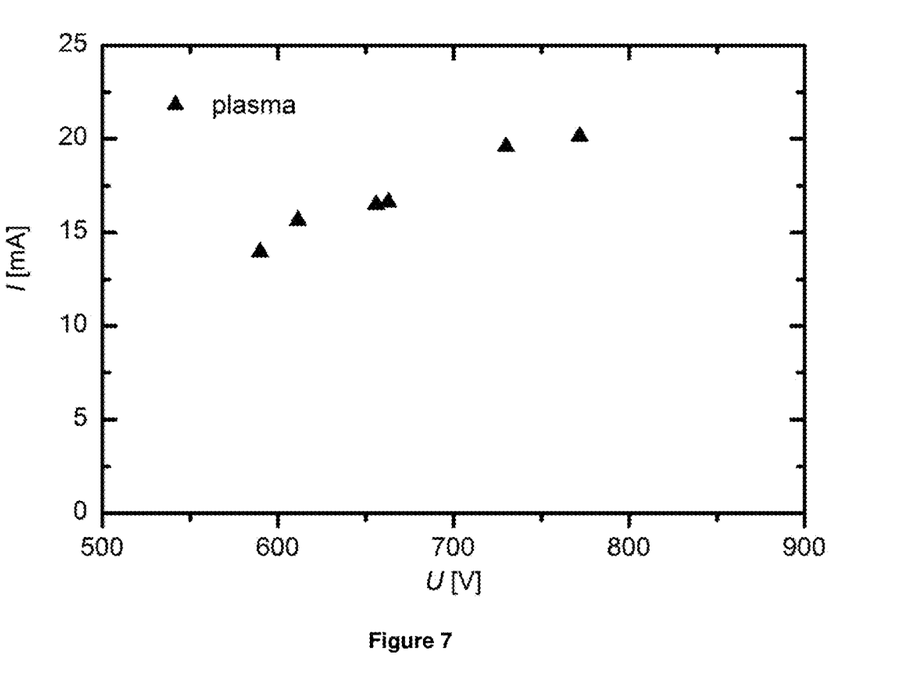
FIG. 7 shows the measured electrical current versus the voltage of the voltage source 12 for the configuration as in FIG. 6 and Example 2.

The configuration presented in FIG. 2 was adopted for Example 2. The dimensions were as indicated in FIG. 6. The device is shown schematically in FIG. 5. The voltage was increased and the corresponding current measured. FIG. 7 represents the measured current versus measured voltage for the case of dielectric guides 2 and 3—Example 2. At around 600 V the current value is of about 15 mA and keeps increasing slowly with increasing voltage. The current-voltage characteristic is different from that of Example 1. The current is much lower, about 2 orders of magnitude lower. The current-voltage characteristic shown in FIG. 7 is typical for a glow discharge in gas at moderately low pressure. As long as the voltage is below the threshold, the current is negligible. At a sudden increase of the current (at voltage 600 V in FIG. 7), the breakdown of the gas between the electrodes 6 and 7 occurs. The discharge voltage and current as observed in FIG. 7 are typical for glow discharge occurring in the gas between two electrodes at the pressure of several 10 mbar. Scientific background on gaseous discharges in water vapour in a range of pressures can be found in Škoro et al. The configuration as adopted in Example 2, therefore, enables almost all power from the voltage source 12 to be spent for sustaining gaseous plasma in a single, stable cavitation bubble 5 between the electrodes 6 and 7. The electrical current does not flow through liquid water since the non-insulated parts of the electrodes are dry—not in contact with water at any time.

Figure 4:
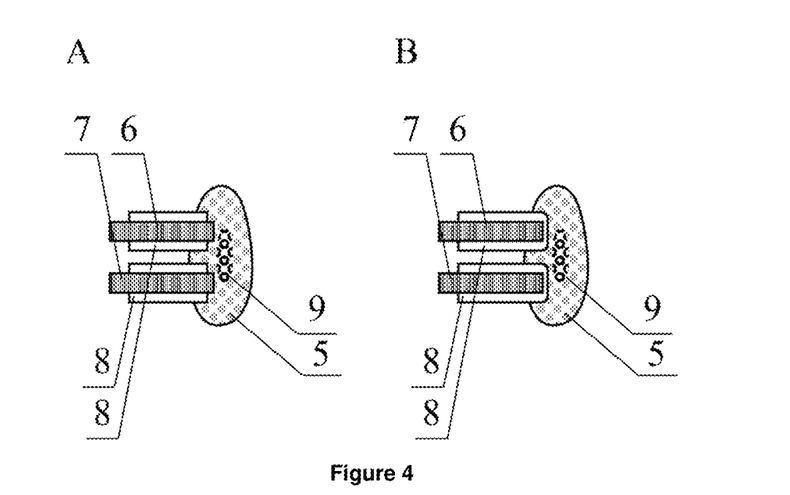
FIG. 4 is a schematic view of two electrode configurations that may be used in the water treatment device of the present disclosure. Each electrode consists of a conducting part 6, 7, and an insulating part 8.

The examples disclosed above show the usefulness of the preferred configurations. The preferred configurations are just examples. Several other configurations will be apparent to those skilled in art. Voltages may be higher than presented in Examples 1 and 2, if fully isolated electrodes, as presented in FIG. 4B, are used. Namely, FIG. 4B discloses an alternative configuration of the electrodes 6 and 7, where the entire electrodes are insulated. Application of the configuration as in FIG. 4B limits the choice of voltage source. For example, a DC voltage source would not be suitable if the configuration of FIG. 4B is used.

In one embodiment, for example, the water pump 11 is replaced with a piston to enable appropriate water flow 1 through the guides 2 and 3. The function of both the water pump and the piston regarding the shortest distance 17 between dielectric guides 2 and 3 is identical: establishing an appropriate pressure difference to form a single, stable cavitation bubble 5. The pressure in the single, stable cavitation bubble 5 is at least the same as the vapour pressure of liquid water.

The details presented in FIG. 6 are only exemplary. Numerous other dimensions and forms are useful as long as the non-insulated parts of the electrodes are positioned inside the single, stable cavitation bubble 5. A skilled person will find numerous configurations feasible as long as the electrodes are dry.

Figure 9:
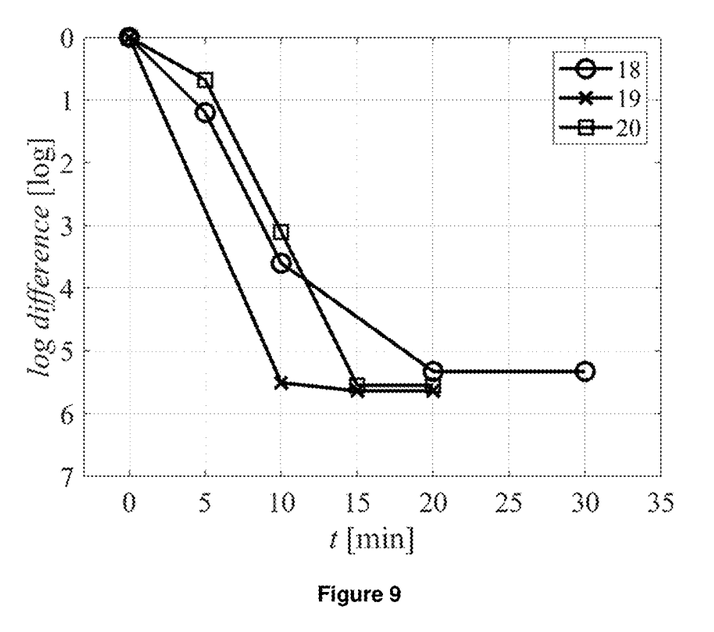
FIG. 9 shows three deactivation curves for MS2 bacteriophage versus treatment time using the configuration as in FIGS. 5 and 6. The initial concentration for curve 18 was $2.15 \times 10^5$ PFU/ml, for curve 19 it was $4.32 \times 10^5$ PFU/ml and for curve 20 it was $3.54 \times 10^5$ PFU/ml. In all cases, the treated volume was 3 litres.

FIG. 9 represents an example of a virus deactivation using the methods of the aspects of the disclosed embodiments. The configurations of FIGS. 5 and 6 were used. The connection pipe 14 enabled pumping of the polluted water from the outlet container 13 back to the inlet container 10, which enabled a continuous treatment of polluted water with plasma 9 sustained between the electrodes 6 and 7 in the single, stable cavitation bubble 5. Liquid water was intentionally inoculated with MS2 bacteriophage (an indicator virus routinely used to assess viral inactivation methods) in three independent experiments: i) with the concentration of $2.15 \times 10^5$ PFU/ml, ii) with the concentration of $4.32 \times 10^5$ PFU/ml, and iii) with the concentration of $3.54 \times 10^5$ PFU/ml. The volume of treated liquid water was 3 litres. The treatment ran continuously either for 20 minutes or half an hour. Small quantities of water (samples) were taken occasionally to monitor the concentration of infective MS2 bacteriophage in the water versus treatment time. The decrease in the concentration of infective viruses (log difference) is plotted in FIG. 9 with three curves. Curves 18, 19 and 20 represent the log difference versus time for initial MS2 bacteriophage concentrations of $2.15 \times 10^5$ PFU/ml, $4.32 \times 10^5$ PFU/ml, and 3.54×10⁵ PFU/ml, respectively. In one of the inactivation experiments shown in FIG. 9, the concentration dropped by an order of magnitude after 5 minutes of treatment (curve 18) and by more than 5 log after 20 min of treatment. In the second treatment, inactivation of more than 5 log was achieved after 10 min of treatment (curve 19), while in the third experiment, similar inactivation was achieved after 15 min. All experiments were able to reduce the concentration of infective MS2 bacteriophage to values that are prescribed as sterile conditions according to the US EPA Ground Water Rule (EPA 815-R-06-012; October 2006).

In a separate experiment (graph not shown), the initial concentration of MS2 bacteriophage in 3 L of contaminated water was $3.83 \times 10^8$ PFU/ml. In 30 minutes of continuous treatment using the methods of the present disclosure, 8.28-log inactivation was achieved. The deactivation of MS2 bacteriophage using the methods of the present disclosure was therefore completed in time useful for many applications in biology and medicine.

What is claimed is:

1. A liquid treatment device comprising:
   (a) a wedge-shaped nozzle with a two-part divergent portion positioned downstream of a narrowest portion of the nozzle, wherein a divergent angle of a first part of the two-part divergent portion closer to the narrowest portion of the nozzle is in the range 3° to 20°, and a divergent angle of a second part of the two-part divergent portion further from the narrowest portion of the nozzle is in the range 10° to 40°, and a speed of liquid is between 50 and 500 m/s, to sustain a single, stable cavitation bubble due to vaporisation phenomena caused by a 4- to 50-times reduction in static pressure in the liquid after the liquid passes the narrowest portion of the nozzle; and
   (b) one or more electrodes configured to penetrate the single, stable cavitation bubble so that there is no direct electrical contact between the one or more electrodes and the liquid, the one ore more electrodes being configured to generate a continuous gaseous discharge within the single, stable cavitation bubble.

2. The liquid treatment device of claim 1, wherein each of the one or more electrodes comprises:
   (a) a discharge portion positioned within the single, stable cavitation bubble sustained by the nozzle during use; and
   (b) a conducting portion adjacent to the discharge portion, wherein a surface of the conducting portion is coated with an insulator to prevent contact of liquid with the electrode.

3. The liquid treatment device of claim 1, further comprising a pump to establish a constant flow condition through the device to enable the sustenance of a single, stable cavitation bubble.

4. The liquid treatment device of claim 1, further comprising a high-voltage power supply electrically coupled to the one or more electrodes, and wherein the high voltage power supply provides a DC voltage, a pulsed DC voltage or an AC voltage.

5. A method for treating liquid, wherein the liquid passes a wedge-shaped nozzle with a two-part divergent portion positioned downstream of a narrowest portion of the nozzle, wherein a divergent angle of a first part of the two-part divergent portion closer to the narrowest of the nozzle is in the range 3° to 20°, and a divergent angle of the second part of the two-part divergent portion further from the narrowest of the nozzle is in the range 10° to 40°, and a speed of liquid between 50 and 500 m/s, to sustain a single, stable cavitation bubble due to vaporisation phenomena caused by a 4- to 50-times, reduction in static pressure in the liquid after the liquid passes the narrowest portion of the nozzle, while generating a continuous gaseous discharge within the single, stable cavitation bubble with one or more electrodes configured to penetrate the single, stable cavitation bubble so that there is direct electrical contact between the one or more electrodes and the liquid.

6. The method of claim 5, wherein the continuous gaseous discharge is an AC or DC glow discharge.

7. The method of claim 5, wherein the continuous gaseous discharge is a dielectric barrier discharge.

8. The method of claim 5, further comprising deactivating viruses and microbes within the liquid.

9. The liquid treatment device of claim 1, wherein the divergent angle of the first part is in the range 5° to 15°.

10. The liquid treatment device of claim 1, wherein the divergent angle of the second part is in the range 20° to 30°.

11. The liquid treatment device of claim 1, wherein the speed of liquid is between 100 and 300 m/s.

12. The liquid treatment device of claim 1, wherein there is a 7 to 15 times, reduction in static pressure in the liquid after the liquid passes the narrowest portion of the nozzle.

13. The method of claim 5, wherein the divergent angle of the first part is in the range 5° to 15°.

14. The method of claim 5, wherein the divergent angle of the second part is in the range 20° to 30°.

15. The method of claim 5, wherein the speed of liquid is between 100 and 300 m/s.

16. The method of claim 5, wherein there is a 7 to 15 times, reduction in static pressure in the liquid after the liquid passes the narrowest portion of the nozzle.

* * * * *